US007940432B2

(12) United States Patent
Shih et al.

(10) Patent No.: US 7,940,432 B2
(45) Date of Patent: May 10, 2011

(54) SURVEILLANCE SYSTEM HAVING A MULTI-AREA MOTION DETECTION FUNCTION

(75) Inventors: Chi-Hsien Shih, Chung Ho (TW); Mao-Cheng Wu, Chung Ho (TW)

(73) Assignee: Avermedia Information, Inc., Chung Ho (TW)

( * ) Notice: Subject to any disclaimer, the term of this patent is extended or adjusted under 35 U.S.C. 154(b) by 1604 days.

(21) Appl. No.: 11/251,808

(22) Filed: Oct. 18, 2005

(65) Prior Publication Data

US 2006/0215030 A1 Sep. 28, 2006

(30) Foreign Application Priority Data

Mar. 28, 2005 (TW) ................................ 94109661 A

(51) Int. Cl.
*H04N 1/04* (2006.01)

(52) U.S. Cl. ....... 358/474; 358/1.15; 358/501; 348/155; 375/240.01; 382/107; 382/103

(58) Field of Classification Search .................. 358/474, 358/486, 488, 448, 501, 1.15; 348/155, 143, 348/153, 152; 375/240.01, E7.026, E7.104; 382/107, 103
See application file for complete search history.

(56) References Cited

U.S. PATENT DOCUMENTS

| | | | | |
|---|---|---|---|---|
| 4,337,481 | A * | 6/1982 | Mick et al. | 348/154 |
| 5,828,848 | A * | 10/1998 | MacCormack et al. | 709/247 |
| 5,909,548 | A * | 6/1999 | Klein et al. | 709/217 |
| 6,970,183 | B1 * | 11/2005 | Monroe | 348/143 |
| 7,346,188 | B2 * | 3/2008 | Aichi | 382/103 |
| 7,385,626 | B2 * | 6/2008 | Aggarwal et al. | 348/143 |
| 7,577,199 | B1 * | 8/2009 | Herz | 375/240.16 |
| 2002/0008758 | A1 * | 1/2002 | Broemmelsiek et al. | 348/143 |
| 2004/0119819 | A1 * | 6/2004 | Aggarwal et al. | 348/143 |
| 2004/0227812 | A1 * | 11/2004 | Blair | 348/61 |
| 2004/0233282 | A1 * | 11/2004 | Stavely et al. | 348/143 |
| 2005/0002561 | A1 * | 1/2005 | Monachino et al. | 382/159 |
| 2005/0152579 | A1 * | 7/2005 | Park et al. | 382/103 |
| 2005/0162515 | A1 * | 7/2005 | Venetianer et al. | 348/143 |
| 2005/0244033 | A1 * | 11/2005 | Ekin et al. | 382/103 |
| 2005/0259846 | A1 * | 11/2005 | Freeman et al. | 382/103 |
| 2005/0271250 | A1 * | 12/2005 | Vallone et al. | 382/103 |
| 2005/0271251 | A1 * | 12/2005 | Russell et al. | 382/103 |
| 2006/0088092 | A1 * | 4/2006 | Chen et al. | 375/240.01 |
| 2006/0170772 | A1 * | 8/2006 | McEwan | 348/152 |
| 2008/0158361 | A1 * | 7/2008 | Itoh et al. | 348/155 |
| 2009/0322873 | A1 * | 12/2009 | Reilly et al. | 348/143 |
| 2010/0013917 | A1 * | 1/2010 | Hanna et al. | 348/143 |
| 2010/0026802 | A1 * | 2/2010 | Titus et al. | 348/143 |

* cited by examiner

*Primary Examiner* — Negussie Worku

(57) ABSTRACT

A surveillance system having a multi-area motion-detection function is described. The surveillance system includes a display, an area selection device, and a threshold input device. The display shows a surveillance video. The area selection device selects a first area and a second area on the display screen. The threshold input device sets a motion-detection threshold of the first area and a motion-detection threshold of the second area. When the result of the motion-detection exceeds the motion-detection threshold of the first area, the surveillance video is stored in a storage medium. When the result of the motion-detection exceeds the motion-detection threshold of the second area, the surveillance video is stored in the storage medium.

16 Claims, 2 Drawing Sheets

SURVEILLANCE SYSTEM HAVING A MULTI-AREA MOTION DETECTION FUNCTION

RELATED APPLICATIONS

The present application is based on, and claims priority from, Taiwan Application Serial Number 94109661, filed Mar. 28, 2005, the disclosure of which is hereby incorporated by reference herein in its entirety.

BACKGROUND

1. Field of Invention

The present invention relates to a surveillance system and a surveillance method. More particularly, the present invention relates to a surveillance system and a surveillance method having a multi-area motion-detection function.

2. Description of Related Art

In a surveillance system, it will take a huge amount of storage capacities when the surveillance system continues to capture continuous surveillance videos for a long time; therefore, a technology of motion-detection is developed. The technology of motion-detection is capable of detecting an instant surveillance video. When a motion is occurred on the surveillance video, the surveillance video will be recorded or a warning message will be sent out by the surveillance system, if not; the surveillance video will not be recorded or a warning message will not be sent out by the surveillance system.

However, according to the conventional technology of motion-detection, an erroneous judgment is often happened in the condition of motion-detection. For a surveillance system arranged in a room as an example, the surveillance video would be affected because the variation of weather or sunshine outside the room would be frequently through the window, so that the mechanism of motion-detection would assume that the surveillance video need to be recorded or need to send out a warning message and thus an erroneous judgment is made.

There are the same troublesome matters for an exterior surveillance system, for example the cars ran on the road and the pedestrians walked on the street not only usually cause the mechanism of motion-detection to make an erroneous judgment, but also the troublesome matters are produced due to those unnecessary surveillance videos often to be recorded.

According to the foregoing description, a surveillance system and a surveillance method capable of saving a capacity of a storage medium and preventing an erroneous judgment occurred in the mechanism of motion-detection are needed.

SUMMARY

It is therefore an objective of the present invention to provide a surveillance system and a surveillance method having a multi-area motion-detection function, which are able to merely monitor an object with a motion-detection operation while not to be affected by the motion of other objects.

It is another objective of the present invention to provide a surveillance system and a surveillance method having a multi-area motion-detection function, which are able to prevent those unwanted variations of images to be recorded or send out a wrong warning message by the surveillance system.

It is still another objective of the present invention to provide a surveillance system and a surveillance method having a multi-area motion-detection function, which allows a user to decide the divides of the monitored areas and to set a motion-detection sensitivity for each area.

According to the foregoing objectives of the invention, the present invention provides a surveillance system having a multi-area motion-detection function. According to a preferred embodiment of the present invention, the surveillance system having a multi-area motion-detection function comprises a display, an area selection device and a threshold input device. The display displays a surveillance video. The area selection device selects a first area and a second area on the surveillance video. The threshold input device sets a motion-detection threshold of the first area and a motion-detection threshold of the second area. When the result of the motion-detection of the first area exceeds the motion-detection threshold of the first area, the surveillance video is stored in a storage medium. When the result of the motion-detection of the second area exceeds the motion-detection threshold of the second area, the surveillance video is stored in the storage medium.

In another embodiment, when the result of the motion-detection of the first area exceeds the motion-detection threshold of the first area and the result of the motion-detection of the second area exceeds the motion-detection threshold of the second area, the surveillance video is stored in the storage medium.

According to an object of the invention, the present invention provides a surveillance method having a multi-area motion-detection function. According to a preferred embodiment of the present invention, the surveillance method comprises the steps of framing a plurality of areas including a first area and a second area on a surveillance video and setting a motion-detection sensitivity for each area.

The step of setting a motion-detection sensitivity may comprises the steps of selecting a first area and a second area on the surveillance video, setting a motion-detection threshold of the first area, setting a motion-detection threshold of the second area, when the result of the motion-detection of the first area exceeds the motion-detection threshold of the first area, the surveillance video is stored in a storage medium, and when the result of the motion-detection of the second area exceeds the motion-detection threshold of the second area, the surveillance video is stored in the storage medium.

The present invention at least comprises the following advantages, wherein each embodiment may comprises one or more advantages. The surveillance system and the surveillance method having a multi-area motion-detection function of the present invention are able to merely monitor an object with a motion-detection operation while not to be affected by the motion of other objects. The surveillance system and the surveillance method of the present invention are able to prevent those unwanted variations of images to be recorded or send out a wrong warning message by the surveillance system. According to the surveillance system and the surveillance method of the present invention, which allow a user to decide the divides of the monitored areas and to set a motion-detection sensitivity for each area.

It is to be understood that both the foregoing general description and the following detailed description are by examples and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
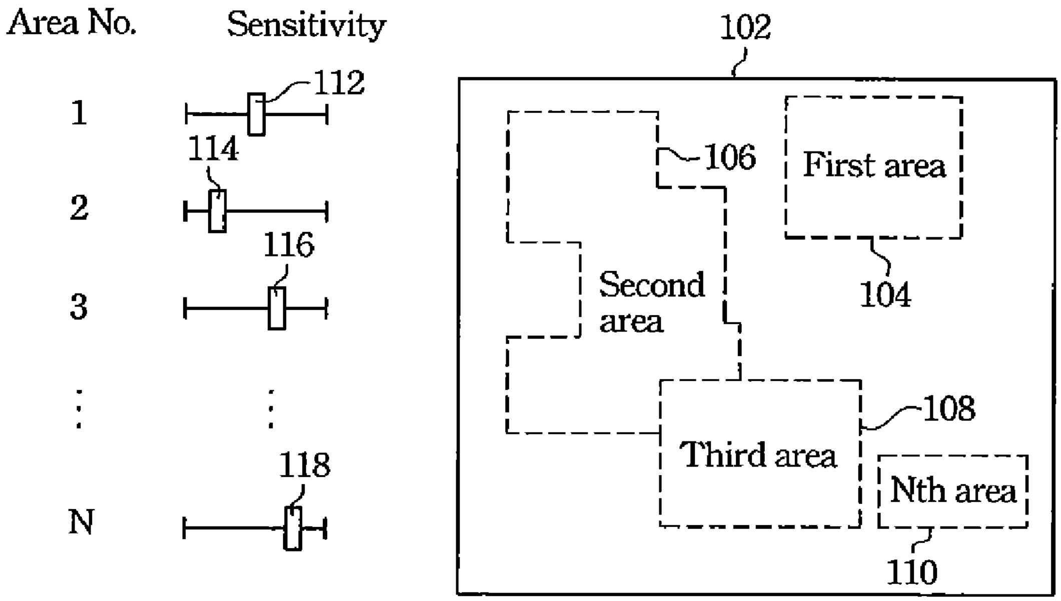
FIG. 1 is a schematic diagram in accordance with an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram in accordance with an embodiment of the present invention. Referring to FIG. 1, a surveillance video 102 could be divided into a first area 104, a second area 106 and a third area 108 by a user, for example. Each area corresponds to a motion-detection with different sensitivities. By using the manner of motion-detection with different sensitivities, the present invention is able to avoid areas that may produce an erroneous judgment and increase areas that need high detection sensitivity.

In one embodiment, the user can use a mouse to frame the first area 104, the second area 106 and the third area 108. The second area 106 is not a rectangle and the second area 106 could be formed by framing many times and combined together, as shown in FIG. 1. The third area 108 covers a portion of the second area 106 and the covered portion is incorporated into the third area 108. The user is able to frame numerous areas such as N areas according to his/her request and each area could be set to has a same or a different sensitivity.

In one embodiment, the step of setting a motion-detection sensitivity includes sets a motion-detection threshold of the first area 104 and a motion-detection threshold of the second area 106. When the result of the motion-detection of the first area 104 exceeds the motion-detection threshold of the first area 104, the surveillance video 102 is stored in a storage medium. When the result of the motion-detection of the second area 106 exceeds the motion-detection threshold of the second area 106, the surveillance video 102 is stored in the storage medium. The storage medium is a hard disk, for example.

In another embodiment, when the result of the motion-detection of the first area 104 exceeds the motion-detection threshold of the first area 104 and the result of the motion-detection of the second area 106 exceeds the motion-detection threshold of the second area 106, the surveillance video 102 is stored in a storage medium.

In the first area 104, for example, the method of the motion-detection includes compares a difference between each pixel in two different videos such as a previous video and a current video, after the difference is calculated and a calculation is generated, then compares the calculation with the motion-detection threshold. If the calculation is higher than the motion-detection threshold, it represents that the object captured in the first area 104 was likely be moved and the surveillance system starts to record the video. If the calculation is lower than the motion-detection threshold, the surveillance system will not record the video.

Similarly, the second area 106 is also set to have a motion-detection threshold. According to the threshold, the second area 106 compares a difference between a calculation and the motion-detection threshold and determines whether to record a video. The motion-detection could be any of algorithms or mathematics and the above threshold merely represents a parameter could be set by a user in these all kinds of algorithms, wherein the parameter is not limited to a calculation of a difference between pixels. A parameter used in the other algorithms could be as a threshold.

In one embodiment, a motion-detection threshold of the first area 104 would be adjusted by shifting a selection bar 112. A motion-detection threshold of the second area 106 would be adjusted by shifting a selection bar 114. Similarly, a motion-detection threshold of the third area 108 would be adjusted by shifting a selection bar 116 and a motion-detection threshold of the N area 110 would be adjusted by shifting a selection bar 118.

In another embodiment, the motion-detection threshold of the first area 104 and the motion-detection threshold of the second area 106 are inputted through a screen. For example, a block corresponding to the first area 104 is displayed on the screen and a user is able to input a motion-detection threshold. For example, the user can input a number from 0 to 255, wherein the number represents a motion-detection threshold and sensitivity. Similarly, the second area 106, the third area 108 or the N area 110 could be set to have a motion-detection threshold by inputting a number, respectively.

Figure 2:
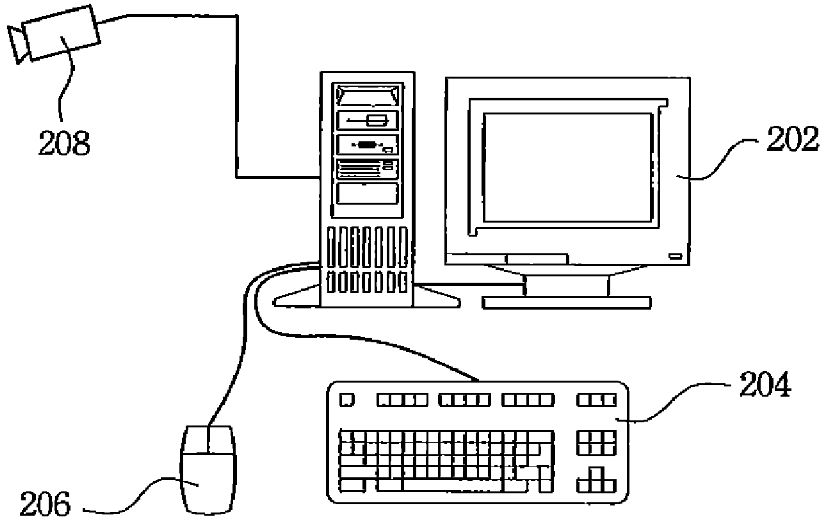
FIG. 2 is a schematic diagram of a surveillance system in accordance with an embodiment of the present invention.

FIG. 2 is a schematic diagram of a surveillance system in accordance with an embodiment of the present invention. Referring to FIG. 1 and FIG. 2, the surveillance video is displayed on a monitor 202. An area selection device such as a mouse 206 is used to select a first area 104 and a second area 106 on the surveillance video. The threshold input device such as a keyboard 204 is used to set a motion-detection threshold of the first area 104 and a motion-detection threshold of the second area 106. The camera 208 is used to provide the surveillance video in the surveillance system.

Figure 3:
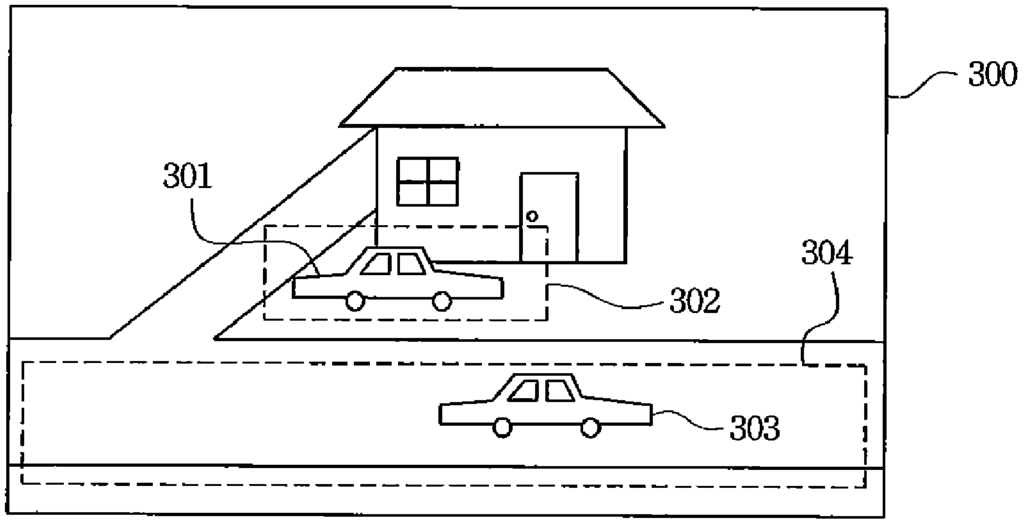
FIG. 3 is one example applicable to a surveillance system of the present invention.
Figure 4:
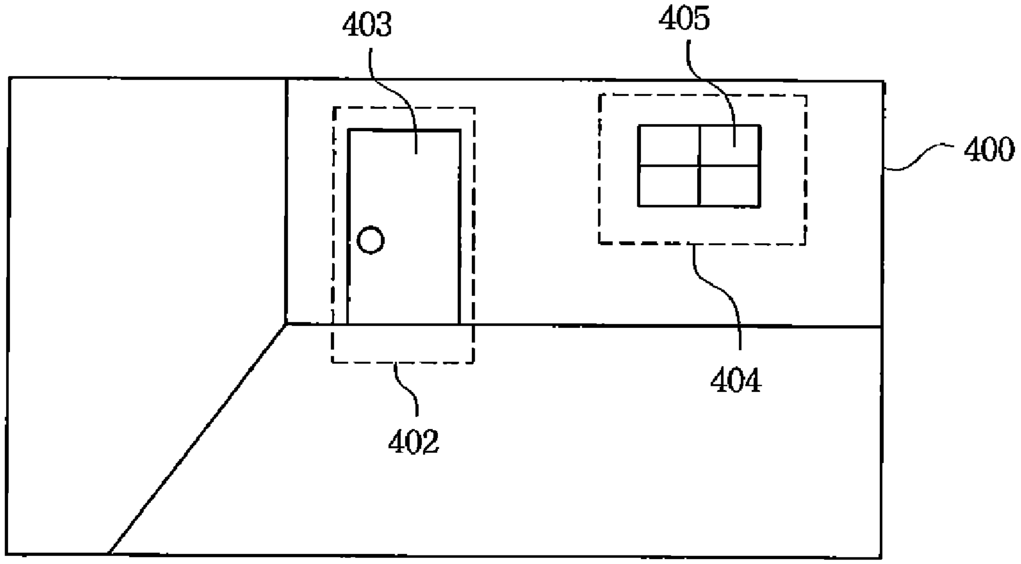
FIG. 4 is another example applicable to a surveillance system of the present invention.

FIG. 3 is one example applicable to a surveillance system of the present invention, and FIG. 4 is another example applicable to a surveillance system of the present invention. Referring to FIG. 3, in a surveillance video 300, for example, a user want to monitor a car 301 whether to safe while not want to monitor those cars 303 ran on the road. Therefore, the user is able to divide the surveillance video 300 into two areas 302 and 304. For example, the area 302 could be set to have a higher sensitivity or a lower motion-detection threshold, and the area 304 could be set to have a lower sensitivity or a higher motion-detection threshold. Hence, when the car moved or shifted, the surveillance system is able to start recording or send out a warning sound or showing a warning video. When the car 303 ran on the road, the surveillance system will not to record or send out a warning. Accordingly, the user can filter out those unwanted monitored objects and events and the user only need to focus on those wanted monitored targets.

Referring to FIG. 4, which shows a surveillance video 400 corresponding to an office. In the surveillance video 400, an image of the window 405 would be changed frequently due to the variation of the outside sunshine or weather. For example, a user wants to monitor and record an area by using a technology of motion-detection while not wants the recording video to be affected by the image of the window 405. An object of the user is to know if anyone enters from the door 403, thus the user can divide the surveillance video 400 into two areas 402 and 404. In this case, the area 402 could be set to have a higher sensitivity or a lower motion-detection threshold, and the area 404 could be set to have a lower sensitivity or a higher motion-detection threshold. Hence, when the door 403 moved or shifted, the surveillance system can start recording or send out a warning sound or showing a warning video. When the image of the window 405 varied, the surveillance system will not to record or send out a warning. Accordingly, the user can filter out those unwanted monitored objects and events and the user only need to focus on those wanted monitored targets.

The present invention at least comprises the following advantages, wherein each embodiment may comprises one or more advantages. The surveillance system and the surveillance method having a multi-area motion-detection function of the present invention are able to merely monitor an object with a motion-detection operation while not to be affected by the motion of other objects. The surveillance system and the surveillance method of the present invention are able to prevent those unwanted variations of images to be recorded or send out a wrong warning message by the surveillance system. According to the surveillance system and the surveillance method of the present invention, the user is able to decide the divides of the monitored areas and to set a motion-detection sensitivity for each area.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A surveillance apparatus having a multi-area motion-detection function, comprising:

a host;

a camera connected to the host;

a display connected to the host for displaying a surveillance video provided from the camera;

an area selection device connected to the host for selecting a first area and a second area on the surveillance video;

a threshold input device connected to the host for setting a motion-detection threshold of the first area and a motion-detection threshold of the second area; and a storage medium for storing the surveillance video when a detected motion of either the first area or the second area exceeds the motion-detection thresholds of the first or second area, respectively.

2. The surveillance apparatus of claim 1, wherein the area selection device comprises a pointing device for framing and selecting the first area and the second area.

3. The surveillance apparatus of claim 1, wherein the threshold input device comprises at least one selection bar controlled by a pointing device for adjusting the motion-detection threshold of the first area and the motion-detection threshold of the second area.

4. The surveillance apparatus of claim 1, wherein the threshold input device comprises at least one screen input block for inputting the motion-detection threshold of the first area and the motion-detection threshold of the second area.

5. A surveillance apparatus having a multi-area motion-detection function, comprising:

a display for displaying a surveillance video;

an area selection device for selecting a first area and a second area on the surveillance video;

a threshold input device for setting a motion-detection threshold of the first area and a motion-detection threshold of the second area; and a storage medium;

wherein the surveillance video is stored in the storage medium when a detected motion of the first area exceeds the motion-detection threshold of the first area and a detected motion of the second area exceeds the motion-detection threshold of the second area.

6. The surveillance apparatus of claim 5, wherein the area selection device comprises a pointing device for framing and selecting the first area and the second area.

7. The surveillance apparatus of claim 5, wherein the threshold input device comprises at least one selection bar controlled by a pointing device for adjusting the motion-detection threshold of the first area and the motion-detection threshold of the second area.

8. The surveillance apparatus of claim 5, wherein the threshold input device comprises at least one screen input block for inputting the motion-detection threshold of the first area and the motion-detection threshold of the second area.

9. A surveillance method having a multi-area motion-detection function, comprising:

selecting a first area on a surveillance video provided from a camera by an area selection device;

selecting a second area on the surveillance video by the area selection device;

setting a motion-detection threshold of the first area by a threshold input device;

setting a motion-detection threshold of the second area by the threshold input device;

storing the surveillance video in a storage medium when a detected motion of the first area exceeds the motion-detection threshold of the first area; and storing the surveillance video in the storage medium when a detected motion of the second area exceeds the motion-detection threshold of the second area.

10. The surveillance method of claim 9, wherein the steps of selecting the first area and the second area include framing a first specific area and a second specific area, respectively, on the surveillance video.

11. The surveillance method of claim 9, wherein the steps of setting the motion-detection thresholds of the first area and the second area comprise:

shifting at least one selection bar so as to adjust the motion-detection threshold of the first area and the motion-detection threshold of the second area.

12. The surveillance method of claim 9, wherein the steps of setting the motion-detection thresholds of the first area and the second area comprise:

inputting the motion-detection threshold of the first area and the motion-detection threshold of the second area via a screen.

13. A surveillance method having a multi-area motion-detection function, comprising:

selecting a first area on a surveillance video provided from a camera by an area selection device;

selecting a second area on the surveillance video by the area selection device;

setting a motion-detection threshold of the first area by a threshold input device;

setting a motion-detection threshold of the second area by the threshold input device;

storing the surveillance video in a storage medium when a detected motion of the first area exceeds the motion-detection threshold of the first area and a detected motion of the second area exceeds the motion-detection threshold of the second area.

14. The surveillance method of claim 13, wherein the steps of selecting the first area and the second area include framing a first specific area and a second specific area on the surveillance video, respectively.

15. The surveillance method of claim 13, wherein the steps of setting the motion-detection thresholds of the first area and the second area comprise:

shifting at least one selection bar so as to adjust the motion-detection threshold of the first area and the motion-detection threshold of the second area.

16. The surveillance method of claim 13, wherein the steps of setting the motion-detection thresholds of the first area and the second area comprise:

inputting the motion-detection threshold of the first area and the motion-detection threshold of the second area via a screen.

* * * * *